United States Patent
Enzmann et al.

(10) Patent No.: US 6,950,510 B2
(45) Date of Patent: Sep. 27, 2005

(54) ROUTING DATA BASED ON COMPARATIVE INCOME VALUES

(75) Inventors: Mark Enzmann, Roswell, GA (US); Dennis Price, Alpharetta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/735,065

(22) Filed: Dec. 12, 2003

(65) Prior Publication Data

US 2004/0125935 A1 Jul. 1, 2004

Related U.S. Application Data

(63) Continuation of application No. 09/749,970, filed on Dec. 28, 2000, now Pat. No. 6,683,945.

(51) Int. Cl.⁷ .................................................. H04M 5/00
(52) U.S. Cl. ........................ 379/265.11; 379/114.02; 379/221.01; 379/265.01; 379/265.02
(58) Field of Search ..................... 379/114.02, 221.01, 379/265.01, 265.02, 265.11

(56) References Cited

U.S. PATENT DOCUMENTS

| 6,487,289 B1 | 11/2002 | Phan et al. ................. 379/243 |
| 6,542,588 B1 | 4/2003 | Mashinsky ............. 379/114.02 |

Primary Examiner—Ahmad F. Matar
Assistant Examiner—Quynh H. Nguyen
(74) Attorney, Agent, or Firm—Woodcock Washburn LLP

(57) ABSTRACT

Data is dynamically routed between first and second locations. An attempt failure ratio is obtained for each of several data paths capable of providing a data link between the first and second locations, where such ratio represents a proportion of failed linkages by the data path to all attempted linkages by the data path between the first and second locations. A revenue value is also obtained for each data path, where such value represents an amount per unit generated by a successful linkage by the data path between the first and second locations. A comparative income value is then computed for each data path, where such value is a product of the attempt failure ratio for the data path and the revenue value for the data path. Routing information is then selected for routing the data between the first and second locations based on the comparative income value for each data path. The routing information may be employed to route the data by way of at least one of the data paths.

23 Claims, 3 Drawing Sheets

| DATA PATH | B1 | C1 | C2 | C3 |
|---|---|---|---|---|
| REVENUE VALUE ( $ / minute ) | .10 | .20 | .50 | .90 |
| ATTEMPT SUCCESS RATIO ( % ) | 90 | 70 | 20 | 10 |
| COMPARATIVE VALUE ( $ / minute ) | .09 | .14 | .10 | .09 |
| ROUTING INFORMATION | --- | --- | --- | --- |

FIG. 2

ROUTING DATA BASED ON COMPARATIVE INCOME VALUES

CROSS-REFERENCE TO RELATED APPLICATIONS

This application is a continuation of U.S. patent application Ser. No. 09/749,970, filed Dec. 28, 2000 now U.S. Pat. No. 6,683,945 and entitled "Routing Data Based On Comparative Income Values", hereby incorporated by reference in its entirety.

FIELD OF THE INVENTION

The present invention relates generally to routing data between first and second locations based on a comparative income value calculated for each of a plurality of available routings. More particularly, the present invention relates to routing the data based on which routing will generate the most income to the routing entity or which routing will result in the least expense to the routing entity.

BACKGROUND OF THE INVENTION

In recent years, a number of new telephone service features have been provided by an Advanced Intelligent Network (AIN). The AIN evolved out of a need to increase the capabilities of the telephone network architecture in order to meet the growing needs of telephone customers or users. Additionally, as the number of people who rely on the Internet for communication increases, so does the demand for the electronic transfer of data.

Referring now to FIG. 1, it is seen that an AIN-based network arrangement is provided within and/or in conjunction with a telephone system LATA (Local Access and Transport Area) 101 that defines a calling service area. The LATA 101 includes stations (i.e. telephone lines and telephone equipment at the ends thereof) 103 and corresponding service switching points (SSPs) 105 (i.e., end offices or central offices). The SSPs 105 are each programmable switches which: recognize AIN-type calls; launch queries to service control points (SCPs) 107 (only one being shown in FIG. 1); and receive commands and data from SCPs 107 to further process and route AIN-type calls. A signal transfer point (STP) 109 may be employed to route signals between the SSPs 105, the SCPs 107, and other network elements. When one of the SSPs 105 is triggered by an AIN-type call, the triggered SSP 105 formulates an AIN service request and responds to call processing instructions from the network element in which the AIN service logic resides, typically at an SCP 107.

In a telephone system such as those in LATA 101, and absent other considerations, each SSP 105 routes a call from a station 103 coupled thereto and at a first location to a second location according to a generally static routing table that is included with or locally available to such SSP 105 (not shown). As may be appreciated, the second location may be any location, including a location within the LATA 101, external to the LATA 101 but relatively local, or external to the LATA 101 and not relatively local, e.g.

However, and importantly, the information in a static routing table can quickly become old or 'stale'. That is, such information is typically selected to optimize one or more parameters and is based on the telephone or data network within which calls/data are to be routed, and yet such telephone or data network can be expected to change on a minute by minute or even second by second basis. For example, a particular routing may go down at any time, or the operator of such routing may increase a usage cost rate at any time. In contrast with such a dynamic environment, the static routing table typically, is updated once every 24 hours or so. Therefore, the information that the routing table contains and uses to route calls/data quickly becomes obsolete. As is to be appreciated, usage of such obsolete information quickly becomes inefficient and costly.

Accordingly, a need exists for a cost effective method of routing calls/data between a first location and a second location using current real time information. In particular, a need exists for a method of routing calls/data that generates maximum revenue or that incurs the least cost to the routing entity.

SUMMARY OF THE INVENTION

The present invention satisfies the aforementioned need by providing a method of dynamically routing data between a first location and a second location. In the method, an attempt success ratio is obtained for each of a plurality of data paths capable of providing a data link between the first location and the second location. The attempt success ratio for each data path is representative of a proportion of successful linkages by the data path to all attempted linkages by the data path between the first location and the second location.

Additionally, a revenue value is obtained for each of the plurality of data paths. The revenue value for each data path is representative of an amount per unit generated by a successful linkage by the data path between the first location and the second location. A comparative income value is then computed for each of the plurality of data paths, where the comparative income value for each data path is a product of the attempt success ratio for the data path and the revenue value for the data path.

Routing information is then selected for routing the data between the first location and the second location based on the comparative income value for each of the data paths. The routing information may be employed to route the data by way of at least one of the data paths.

BRIEF DESCRIPTION OF THE FIGURES

The foregoing summary as well as the following detailed description of the invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings:

FIG. 2 illustrates a chart showing a routing table including information employed to make routing decisions in accordance with one embodiment of the present invention.

DETAILED DESCRIPTION OF THE INVENTION

Figure 1:
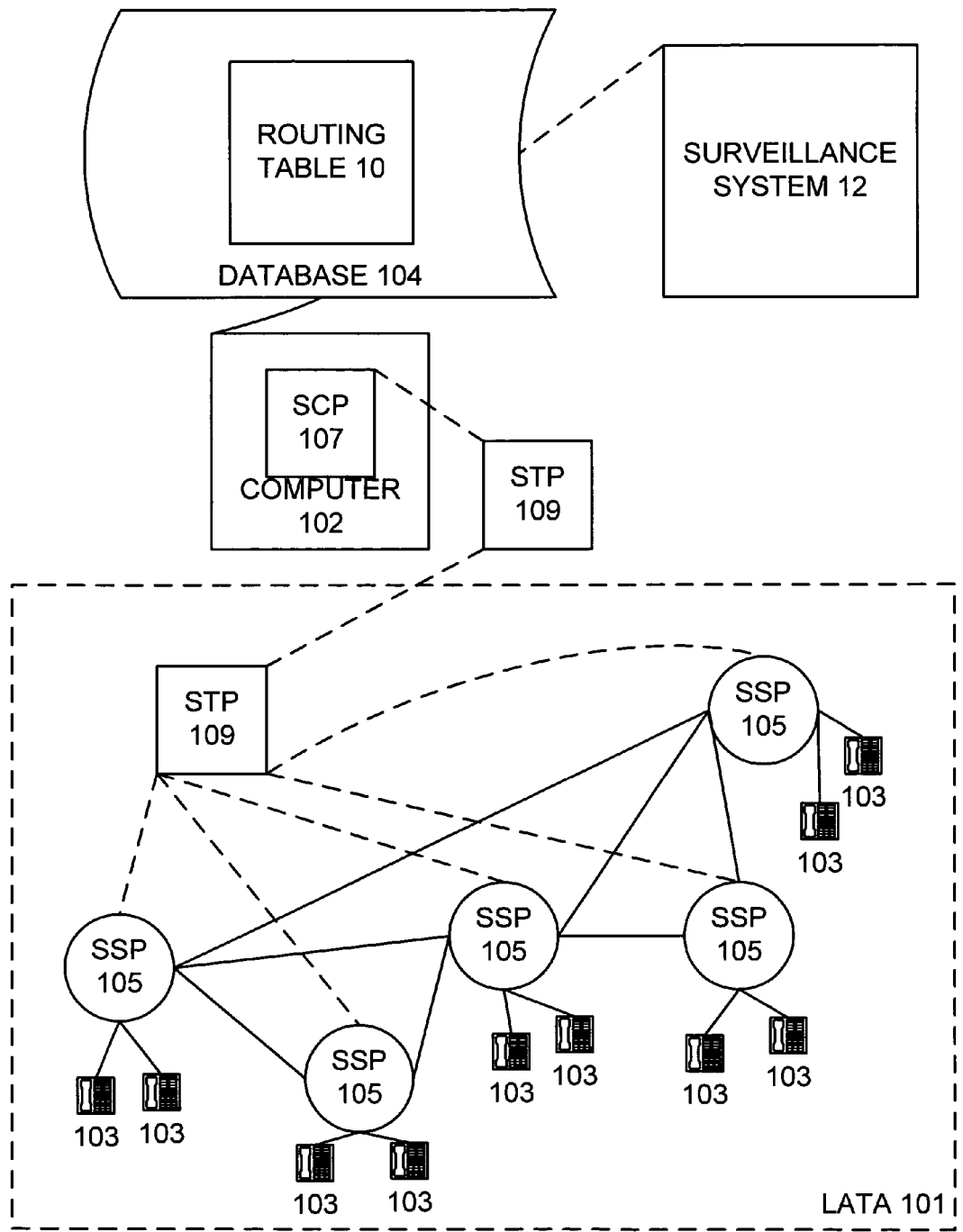
FIG. 1 is a block diagram and shows an Advanced Intelligent Network (AIN) based system for implementing intelligent network management features, such as that which may be employed in connection with the present invention.

In the present invention, data is dynamically routed between a first location and a second location based on information available in a centralized routing table. The data is typically a telephone call originating from within a LATA 101 such as that shown in FIG. 1 or the like. The first location and second location can be anywhere within the LATA 101 or at another LATA communicatively coupled to the LATA 101 without departing from the spirit and scope of the invention. Typically, the telephone call is routed by way of a data path such as a trunk line, although it is to be appreciated that other types of data paths such as microwave links, satellite links, direct links, etc. may be employed without departing from the spirit and scope of the invention.

Although the present invention is disclosed in terms of a telephone call over a telephone network, it is nevertheless to be appreciated that the data may be any other data, such as computer-type data or the like, without departing from the spirit and scope of the present invention. Moreover, such data can be transmitted by way of a network other than a telephone-type network, again without departing from the spirit and scope of the present invention. For example, the network may be a computer-type network such as the Internet or a private computer network.

In a typical telephone network, a local carrier operating one or more LATAs 101 typically completes calls within or between its LATAs 101 by way of data paths owned or controlled by such local carrier. For instance, local carrier A operating one or more LATAs 101 in the Wilkes-Barre, Pa. area would route a call within the area by way of lines owned or controlled by such carrier A. However, in the case where the call originates within the Wilkes-Barre, Pa. area but is destined for an area outside such the Wilkes-Barre, Pa. area, carrier A may have to route the call at least partially by way of a data path that is not owned or controlled by carrier A. For instance, if the aforementioned call is destined for a telephone line in Boynton Beach, Fla., carrier A may have to route the call at least partially by way of a long distance data path such as a trunk line operated by a long distance carrier B. The actual mechanical details of routing calls are generally known or should be apparent to the relevant public and therefore need not be discussed herein in any detail. Accordingly, any appropriate method of performing routing of calls may be employed without departing from the spirit and scope of the present invention.

As discussed above, each SSP 105 operated by the local carrier A may be provided with a static routing table includes all information necessary for routing the call from Wilkes-Barre, Pa. to Boynton Beach, Fla. Such a routing table is known or should be apparent to the relevant public. Accordingly, further details of such static routing table are not provided herein. Note that static routing tables or the like are also employed by data routers to route data between first and second locations.

As also discussed above, the data in the static routing tables can quickly become stale. Moreover, continually updating the data in each and every one of the far-flung tables at each and every one of the far-flung SSPs 105 can quickly become an elaborate and perhaps unwieldy process. Accordingly, in one embodiment of the present invention, such data is centralized and stored in one or perhaps a small number of centralized locations. In particular, in one embodiment of the present invention, and as seen in FIG. 1, the routing table 10 is stored at one or more SCPs 107, for example at a database 104 or the like which is included in or coupled to or accessible by the SCP 107.

Accordingly, to complete a call that requires routing information, an SSP 105 makes a request to an SCP 107 for such routing information, and then completes the call based on the routing information as received from the SCP 107. As known, the request to the SCP 107 from the SSP 105 may be based on the tripping of an appropriate trigger at the SSP 105 when the call is being made. Requesting information from an SCP 107 by an SSP 105 is generally known or should be apparent to the relevant public and therefore need not be discussed herein in any detail. Moreover, any particular method of requesting the routing information from the SCP 107 may be employed without departing from the spirit and scope of the present invention. Note that even with the routing table 10 stored at the SCP 107, each SSP 105 should nevertheless have a reasonably up-to-date backup routing table locally available in the event the SCP 107 is out of operation or unable to communicate with the SSP 105.

In one embodiment of the present invention, the routing information in the routing table 10 includes routing information for routing a call from a first location to a second location by way of a plurality of data paths capable of providing a link between the first location and the second location. For example, for routing a call from Wilkes-Barre, Pa. to Boynton Beach, Fla., several different carriers B, C, etc. may have corresponding data paths (trunk lines, e.g.) available for effectuating the link/call. Moreover, one or more of the carriers may each have multiple alternative data paths available for effectuating the link. For example, and as seen in FIG. 2, carrier B may have a single data path B1, while carrier C has three data paths C1, C2, C3.

Importantly, and as also seen in FIG. 2, for each data path B1, C1, C2, C3, the local carrier A associates a comparative value therewith indicative of how preferential the data path is, where the comparative values for all data paths between the first and second locations may be compared to determine a preferred data path. Such comparative value may be derived in any appropriate manner without departing from the spirit and scope of the present invention. In one embodiment of the present invention, the comparative value for each data path is a function of both a revenue value associated with the data path and the likelihood the call will be successfully completed on the data path.

For each data path, the revenue value associated therewith preferably has monetary relevance to the local carrier A. For example, if the use of the data path requires an overall outlay by carrier A, then the revenue value may represent an overall cost to carrier A, perhaps expressed in an appropriate per unit basis such as per unit of time (minute, e.g.). Here, overall cost may require a consideration of cost paid to owner/controller of the data path and also of value charged to the customer for making the call to result in a net cost per unit.

Similarly, if the use of the data path results in an overall income to the carrier A, then the revenue value may represent an overall income to carrier A, again perhaps expressed in an appropriate per unit basis such as per unit of time (minute, e.g.). Here, and also again, overall income may require a consideration of cost paid to the customer by the owner/controller of the data path directly and also of value charged to the customer for making the call to result in a net profit per unit. Deriving a revenue value for each data path is generally known or should be apparent to the relevant public and therefore need not be discussed in detail herein. Generally, any appropriate mechanism for deriving a revenue value for each data path may be employed without departing from the spirit and scope of the present invention.

As seen in FIG. 2, for carrier A, each of data paths B1, C1, C2, C3 between Wilkes-Barre, Pa. and Boynton Beach, Fla. has a revenue value of 0.10, 0.20, 0.50, and 0.90 dollars per minute, respectively. For purposes of the present example, the revenue value is representative of net profit to carrier A.

For each data path, the likelihood value associated therewith preferably relates to how often a call routed by carrier A through the data path is successfully completed. For example, suppose data path B1 successfully completes the data link nine times out of every ten attempted linkages. Data path B1 therefore has a 90% likelihood that a call attempted therethrough will be completed In one embodiment of the present invention, then, the likelihood value for each data path is an attempt success ratio (ASR) representative of a proportion of successful linkages by the data path to all attempted linkages by the data path. Deriving an ASR for each data path is generally known or should be apparent to the relevant public and therefore need not be discussed in detail herein. Generally, any appropriate mechanism for deriving an ASR for each data path may be employed without departing from the spirit and scope of the present invention.

As seen in FIG. 2, for carrier A, each of data paths B1, C1, C2, C3 between Wilkes-Barre, Pa. and Boynton Beach, Fla. has an ASR of 90, 70, 20, and 10 percent, respectively.

Now, a question arises regarding why the ASR for each data path is even considered. After all, if carrier A simply chooses to route the call by way of data path C3, such carrier A stands to gain a net profit of 0.90 dollars per minute, which is far better than 0.10, 0.20, or 0.50 dollars per minute based on data paths B1, C1, and C2, respectively. However, and importantly, carrier A gains such 0.90 dollars per minute net profit only if the call is successfully completed by way of data path C3. Moreover, the ASR for data path C3 is only 10 percent, meaning that the call will likely be successfully completed only 1 time in 10.

Accordingly, on an overall basis, carrier A will gain 0.90 dollars per minute 10 percent of the time, or 0.09 dollars per minute on an overall basis. In one embodiment of the present invention, then, the comparative value for each data path is the revenue value associated with the data path multiplied by the ASR for the path. Also, in such embodiment, the highest comparative value (in a net profit scenario) or lowest comparative value (in a net cost scenario) of a plurality of data paths capable of providing a data link between a first location and a second location represents the best routing choice.

As seen in FIG. 2, for carrier A, each of data paths B1, C1, C2, C3 between Wilkes-Barre, Pa. and Boynton Beach, Fla. has a comparative value of 0.09, 0.14, 0.10 and 0.09 dollars per minute, respectively. Thus, data path C1 as provided by carrier C is the best routing choice, data path C2 as provided by carrier C is the second best routing choice, and data path B1 and C3 as provided by carriers B and C, respectively, tie for the third best routing choice. Of particular interest here is that even though data path C1 has a revenue value of 0.20 dollars per minute, which is much less that the revenue value of 0.90 dollars per minute for data path C3, data path C1 is nevertheless preferred over data path C3 because the ASR of 70 percent for data path C1 is so much higher than the ASR of 10 percent for data path C3.

Note that with regard to data path C3, for example, during the 9 times out of 10 that the call fails to complete, carrier A will incur set up costs for attempting to complete the call by way of such data path C3, and will otherwise tie up resources while the call waits to go through. Although the comparative value of the present invention does not take such set up costs and tied up resources into account, the relevant public should appreciate that the highest comparative value (in a net profit scenario) or lowest comparative value (in a net cost scenario) nevertheless represents the best routing choice.

Figure 3:
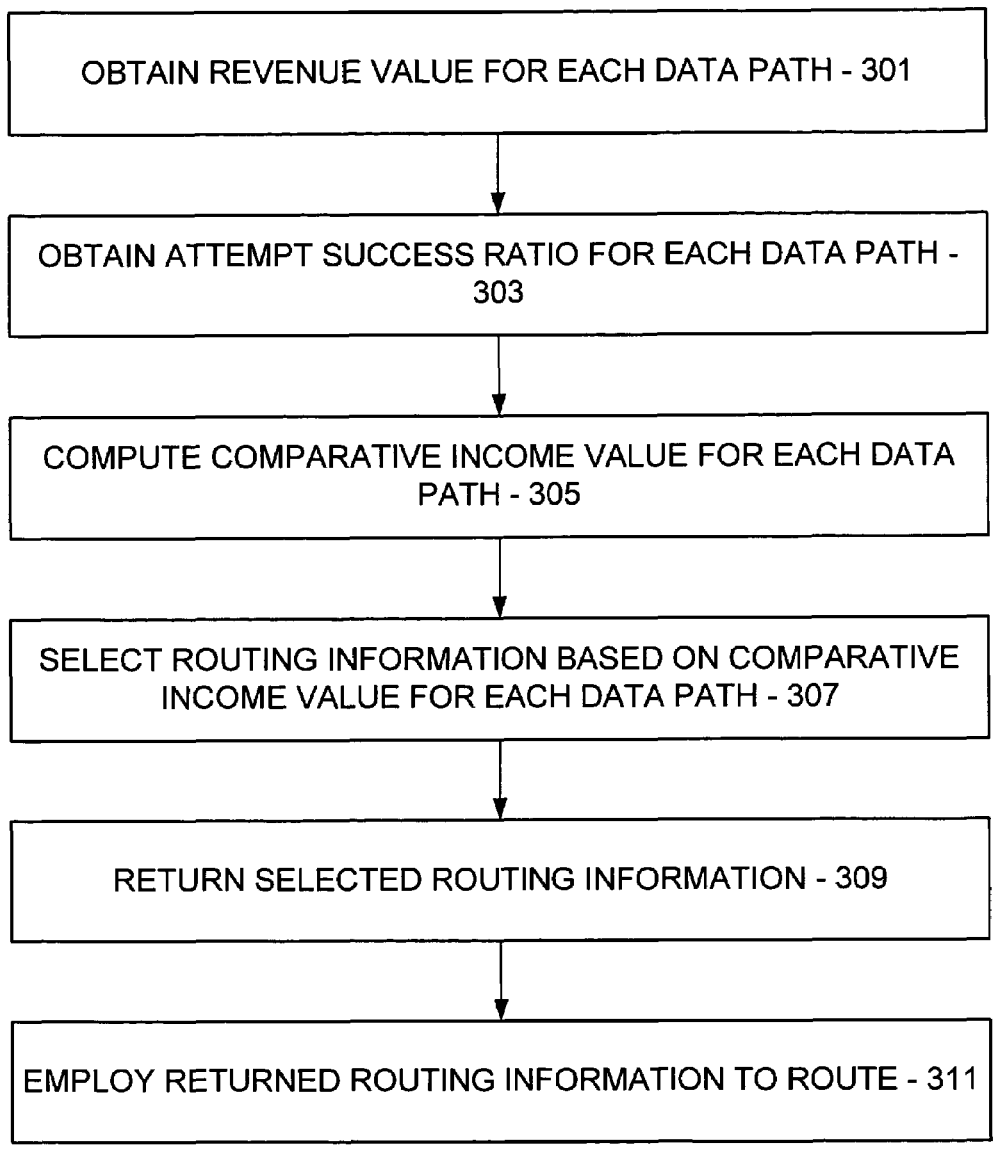
FIG. 3 illustrates a method of dynamically routing data such as a telephone call between a first location and a second location in accordance with one embodiment of the present invention.

In one embodiment of the present invention, then, and referring now to FIG. 3, upon an SCP 107 receiving a request for routing information for a data link from an SSP 105, the SCP 107 obtains a revenue value for each of a plurality of data paths capable of providing a data link between the first location and the second location (step 301), and also obtains an attempt success ratio (ASR) for each of the plurality of data paths (step 303). Thereafter, the SCP 107 computes a comparative value for each of the plurality of data paths, where the comparative value is the product of the attempt success ratio for the data path and the revenue value for the data path (step 305).

Based on the comparative values, then, the SCP 107 selects a best routing choice for the data link based on the comparative value for each data path, and the corresponding routing information for routing the data between the first location and the second location based on the best routing choice (step 307). Such routing information is then returned to the requesting SSP 105 (step 309), and such SSP 105 may then employ the returned routing information to route the telephone call by way of at least one of the data paths (step 311).

In one embodiment of the present invention, the SCP 107 selects at step 307 a plurality of best routing choices and therefore a corresponding plurality of data paths and a corresponding plurality of routing informations based on the comparative income values for the data paths. That is, rather than just selecting data path C1 based on its being the best routing choice, data path C2 may also be selected based on its being the second best routing choice. Of course, additional data paths may also be selected without departing from the spirit and scope of the present invention. As may be appreciated, then all of the routing informations for all of the selected data paths are then returned at step 309 to the requesting SSP 105, and the SSP 105 can then employ at step 311 any of the returned routing informations. Typically, one set of routing information represents a preferred set and another represents an alternate set. Accordingly, the SSP 105 may employ the preferred set to route the call, and if that fails the SSP 105 may employ the alternate set to route the call.

As set forth above, the comparative value for a data path is a function of the revenue value for the data path and the ASR for the data path. However, the comparative value for a data path may be a function of additional values without departing from the spirit and scope of the present invention. For example, values representing current switch conditions, current network conditions, available resources, time of day, and the like may be incorporated into a determination of the comparative value for each data path.

In one embodiment of the present invention, the revenue value and ASR for each data path as noted in the table 10 is updated on a regular basis with current data. The periodicity of such updates is preferably selected to avoid allowing such information to become stale. Particularly with regard to the ASR, this may require that updates be performed in a period of hours or even minutes, or perhaps even seconds. By updating on what amounts to a real-time or near real-time basis, the use of the most current revenue values and ASRs results in the computation of the most accurate comparative values and the most meaningful selection of routing information based on such comparative values.

In one embodiment of the present invention, and as seen in FIG. 1, the table 10 receives such updates from one or more surveillance systems 12. As may be appreciated, each surveillance system 12 continually monitors the telecommunications system and continually calculates current revenue values and current ASRs based on available system information. The surveillance systems 12 are generally known or should be apparent to the relevant public and therefore need not be discussed herein in any detail. Such systems 12 may be any appropriate systems without departing from the spirit and scope of the present invention.

As shown in FIG. 2, the revenue value, ASR, comparative value, and routing information for each data path is stored in the routing table 10 at the SCP 107. Nevertheless, at least some of such information may be stored at a location other than the routing table 10 without departing from the spirit and scope of the present invention. For example, it may be the case that only the routing information is in the routing table 10, while the revenue value, ASR, and comparative value information is stored in another table at the SCP 107. Further, it may be the case that the information of FIG. 2 is stored at an SSP 105. Accordingly, the information may be stored in any appropriate manner and at any appropriate location(s) without departing from the spirit and scope of the present invention.

Note that with regard to the computing of the comparative value (step 305), such computation may be performed at any appropriate time and by any appropriate entity without departing from the spirit and scope of the present invention. For example, the computation may be performed by a loading entity as new revenue values and/or ASRs are loaded into table 10 or the like, and stored with such revenue values and ASRs in the table 10 or the like, or may be performed by an obtaining entity (the SCP 107, e.g.) as revenue values and ASRs are obtained (step 301, 303). In the latter case, the computed comparative values may be stored in the table 10 or the like, or it may be the case that the comparative values are not stored anywhere.

As should now be understood, in the present invention, data such as a telephone call is dynamically routed from a first location to a second location by way of one of a plurality of data paths based on a comparative value associated with each data path. Changes could be made to the embodiments disclosed above without departing from the broad inventive concepts thereof. It is understood, therefore, that this invention is not limited to the particular embodiments disclosed, but it is intended to cover modifications within the spirit and scope of the present invention as defined by the appended claims.

What is claimed is:

1. A method of dynamically routing data between a first location and a second location, the method comprising:
   obtaining an attempt failure ratio for each of a plurality of data paths capable of providing a data link between the first location and the second location, the attempt failure ratio for each data path being representative of a proportion of failed linkages by the data path to all attempted linkages by the data path between the first location and the second location;
   obtaining a revenue value for each of the plurality of data paths, the revenue value for each data path being representative of an amount per unit generated by a successful linkage by the data path between the first location and the second location;
   computing a comparative income value for each of the plurality of data paths, the comparative income value for each data path being a product of the attempt failure ratio for the data path and the revenue value for the data path; and
   selecting routing information for routing the data between the first location and the second location based on the comparative income value for each of the data paths, wherein the routing information may be employed to route the data by way of at least one of the data paths.

2. The method of claim 1 for dynamically routing a telephone call between a first location and a second location, the method comprising:
   obtaining an attempt failure ratio for each of a plurality of telephone paths capable of providing a telephone link between the first location and the second location, the attempt failure ratio for each telephone path being representative of a proportion of failed linkages by the telephone path to all attempted linkages by the telephone path between the first location and the second location;
   obtaining a revenue value for each of the plurality of telephone paths, the revenue value for each telephone path being representative of an amount per unit generated by a successful linkage by the telephone path between the first location and the second location;
   computing a comparative income value for each of the plurality of telephone paths, the comparative income value for each telephone path being a product of the attempt failure ratio for the telephone path and the revenue value for the telephone path;
   selecting routing information for routing the telephone call between the first location and the second location based on the comparative income value for each of the telephone paths, wherein the routing information may be employed to route the telephone call by way of at least one of the telephone paths.

3. The method of claim 2 further comprising:
   transmitting the routing information to a central office; and
   routing the telephone call at the central office according to the transmitted routing information.

4. The method of claim 2 for dynamically routing a telephone call between a first location and a second location, the method comprising:
   obtaining an attempt failure ratio for each of a plurality of trunk lines capable of providing a telephone link between the first location and the second location, the attempt failure ratio for each trunk line being representative of a proportion of failed linkages by the trunk line to all attempted linkages by the trunk line between the first location and the second location;
   obtaining a revenue value for each of the plurality of trunk lines, the revenue value for each trunk line being representative of an amount per unit generated by a successful linkage by the trunk line between the first location and the second location;
   computing a comparative income value for each of the plurality of trunk lines, the comparative income value for each trunk line being a product of the attempt failure ratio for the trunk line and the revenue value for the trunk line;
   selecting routing information for routing the telephone call between the first location and the second location based on the comparative income value for each of the trunk lines, wherein the routing information may be employed to route the telephone call by way of at least one of the trunk lines.

5. The method of claim 1, wherein obtaining the revenue value for each of a plurality of data paths comprises obtaining a value selected from a group consisting of least cost per minute, most revenue per minute and most profit per minute.

6. The method of claim 1 further comprising:
transmitting the routing information to a routing device; and
routing the data at the routing device according to the transmitted routing information.

7. The method of claim 1, the method comprising obtaining both the attempt failure ratio and the revenue value for each data path from a database.

8. The method of claim 7, the method further comprising storing the comparative income value for each data path in the database.

9. The method of claim 7 further comprising updating the database periodically with a current attempt failure ratio for each data path and a current revenue value for each data path.

10. The method of claim 9, comprising updating the database periodically with the current attempt failure ratio for each data path and the current revenue value for each data path as obtained from a surveillance system that monitors such current attempt failure ratio and such current revenue value.

11. The method of claim 1, wherein selecting the routing information further comprises:
selecting a first routing information for routing the data by way of a first data path; and
selecting a second routing information for routing the data by way of a second data path.

12. The method of claim 11, comprising:
selecting the first routing information for routing the data by way of a preferred data path; and
selecting a second routing information for routing the data by way of an alternative data path.

13. A computer having instructions thereon for dynamically routing data between a first location and a second location, the instructions being organized into modules comprising:
a first module for obtaining an attempt failure ratio for each of a plurality of data paths capable of providing a data link between the first location and the second location, the attempt failure ratio for each data path being representative of a proportion of failed linkages by the data path to all attempted linkages by the data path between the first location and the second location;
a second module for obtaining a revenue value for each of the plurality of data paths, the revenue value for each data path being representative of an amount per unit generated by a successful linkage by the data path between the first location and the second location;
a third module for computing a comparative income value for each of the plurality of data paths, the comparative income value for each data path being a product of the attempt failure ratio for the data path and the revenue value for the data path; and
a fourth module for selecting routing information for routing the data between the first location and the second location based on the comparative income value for each of the data paths, wherein the routing information may be employed to route the data by way of at least one of the data paths.

14. The computer of claim 13 for dynamically routing a telephone call between a first location and a second location, the computer comprising:
a first module for obtaining an attempt failure ratio for each of a plurality of telephone paths capable of providing a telephone link between the first location and the second location, the attempt failure ratio for each telephone path being representative of a proportion of failed linkages by the telephone path to all attempted linkages by the telephone path between the first location and the second location;
a second module for obtaining a revenue value for each of the plurality of telephone paths, the revenue value for each telephone path being representative of an amount per unit generated by a successful linkage by the telephone path between the first location and the second location;
a third module for computing a comparative income value for each of the plurality of telephone paths, the comparative income value for each telephone path being a product of the attempt failure ratio for the telephone path and the revenue value for the telephone path; and
a fourth module for selecting routing information for routing the telephone call between the first location and the second location based on the comparative income value for each of the telephone paths, wherein the routing information may be employed to route the telephone call by way of at least one of the telephone paths.

15. The computer of claim 14 for dynamically routing a telephone call between a first location and a second location, the computer comprising:
a first module for obtaining an attempt failure ratio for each of a plurality of trunk lines capable of providing a telephone link between the first location and the second location, the attempt failure ratio for each trunk line being representative of a proportion of failed linkages by the trunk line to all attempted linkages by the trunk line between the first location and the second location;
a second module for obtaining a revenue value for each of the plurality of trunk lines, the revenue value for each trunk line being representative of an amount per unit generated by a successful linkage by the trunk line between the first location and the second location;
a third module for computing a comparative income value for each of the plurality of trunk lines, the comparative income value for each trunk line being a product of the attempt failure ratio for the trunk line and the revenue value for the trunk line; and
a fourth module for selecting routing information for routing the telephone call between the first location and the second location based on the comparative income value for each of the trunk lines, wherein the routing information may be employed to route the telephone call by way of at least one of the trunk lines.

16. The computer of claim 13, wherein the second module for obtaining the revenue value for each of a plurality of data paths comprises obtaining a value selected from a group consisting of least cost per minute, most revenue per minute and most profit per minute.

17. The computer of claim 13 further comprising a module for transmitting the routing information to a routing device, wherein the routing device may route the data according to the transmitted routing information.

18. The computer of claim 13 wherein the first module and the second module obtain the attempt failure ratio and the revenue value for each data path from a database.

19. The computer of claim 18 further comprising a module for storing the comparative income value for each data path in the database.

20. The computer of claim 18 wherein the first module and the second module obtain the attempt failure ratio and the revenue value for each data path from a database that is periodically updated with a current attempt failure ratio for each data path and a current revenue value for each data path.

21. The computer of claim 20, wherein the first module and the second module obtain the attempt failure ratio and the revenue value for each data path from a database that is periodically updated with a current attempt failure ratio for each data path and a current revenue value for each data path as obtained from a surveillance system that monitors such current attempt failure ratio and such current revenue value.

22. The computer of claim 13 wherein the fourth module selects the routing information by selecting a first routing information for routing the data by way of a first data path; and then selecting a second routing information for routing the data by way of a second data path.

23. The computer of claim 22, wherein the fourth module selects the first routing information for routing the data by way of a preferred data path; and selects a second routing information for routing the data by way of an alternative data path.

* * * * *